United States Patent
Ruppert et al.

Patent Number: 5,665,132
Date of Patent: Sep. 9, 1997

[54] PROCESS FOR THE SINTERING OF HOLLOW CYLINDERS OF SILICON DIOXIDE SOOT

[75] Inventors: Klaus Ruppert, Maintal; Uwe Christiansen, Gelnhausen; Michael Hünermann, Alzenau; Klaus Dittmer, Gelnhausen; Anton Steinkohl, Gründau, all of Germany

[73] Assignee: Heraeus Quarzglas GmbH, Hanau, Germany

[21] Appl. No.: 526,944

[22] Filed: Sep. 12, 1995

[30] Foreign Application Priority Data

Sep. 15, 1994 [DE] Germany ............... 44 32 806.0

[51] Int. Cl.$^6$ ............................................. C03B 8/00
[52] U.S. Cl. ............................. 65/17.1; 65/427; 65/144
[58] Field of Search ......................... 65/421, 426, 427, 65/17.1, 144, 30.1

[56] References Cited

U.S. PATENT DOCUMENTS

| | | | |
|---|---|---|---|
| 4,157,906 | 6/1979 | Bailey | 65/3 A |
| 4,251,251 | 2/1981 | Blankenship | 65/3 A |
| 4,289,522 | 9/1981 | Bailey et al. | 65/144 |
| 4,362,545 | 12/1982 | Bailey et al. | 65/169 |
| 4,388,094 | 6/1983 | Carpenter et al. | 65/3.12 |
| 4,486,212 | 12/1984 | Berkey | 65/2 |
| 4,494,968 | 1/1985 | Bhagavatula et al. | 65/3.12 |
| 5,076,824 | 12/1991 | Miller | 65/3.12 |
| 5,352,259 | 10/1994 | Oku et al. | 65/412 |
| 5,423,898 | 6/1995 | Terashima et al. | 65/381 |

FOREIGN PATENT DOCUMENTS

| | | |
|---|---|---|
| 4432806 | 1/1996 | Germany . |
| 59-223242 | 12/1984 | Japan . |
| 62-56733 | 11/1987 | Japan . |
| 63-285128 | 11/1988 | Japan . |

Primary Examiner—Donald E. Czaja
Assistant Examiner—Jacqueline A. Ruller
Attorney, Agent, or Firm—Felfe & Lynch

[57] ABSTRACT

A hollow cylinder is held in a vertical orientation and sent continuously through a heating zone for sintering. In a first phase of the sintering operation, the hollow cylinder stands on a support while the upper end (12) of the cylinder is being sintered. In a second phase the cylinder hangs from a hanging element while its lower end (10) is sintered. A vertical rod is fixed to the base on which the lower end is supported, and extends through the hollow cylinder. A retaining ring is fixed inside the upper end of the hollow cylinder. During the first phase, the upper end vitrifies and contracts so that the retaining ring engages the vertical rod. Longitudinal contraction causes the lower end to lift off the base so that the cylinder is suspended during the second phase.

6 Claims, 2 Drawing Sheets

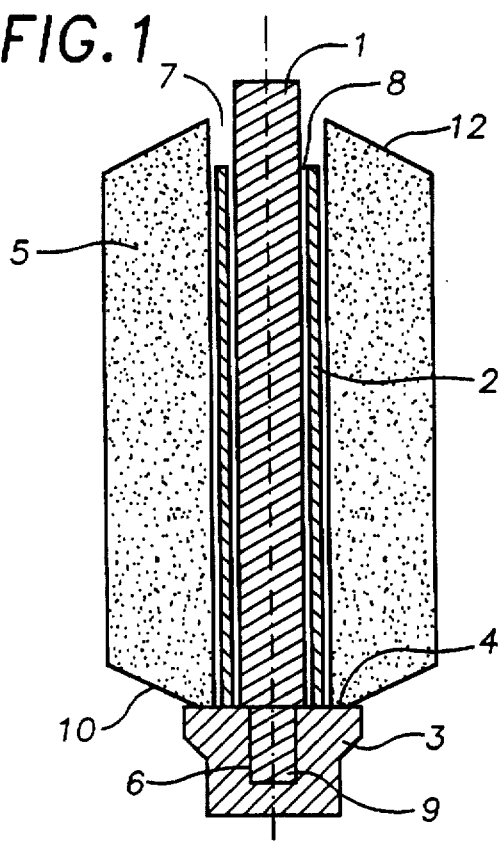
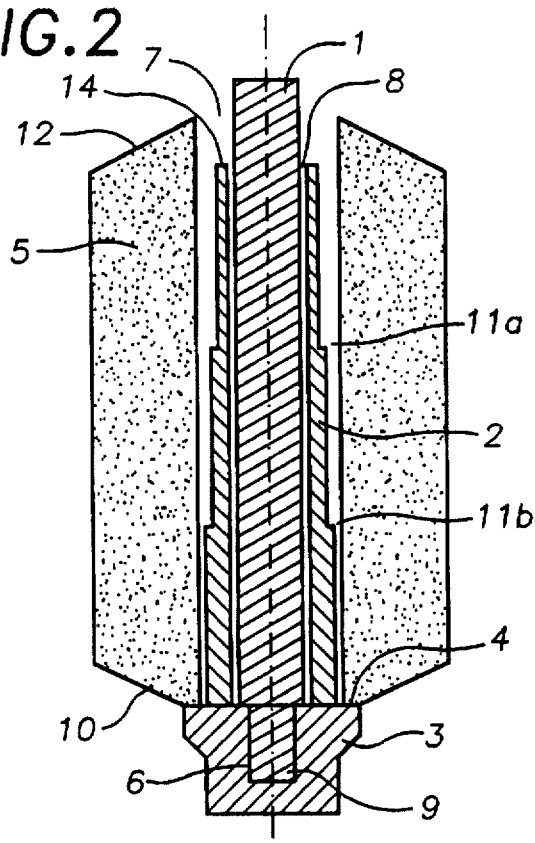
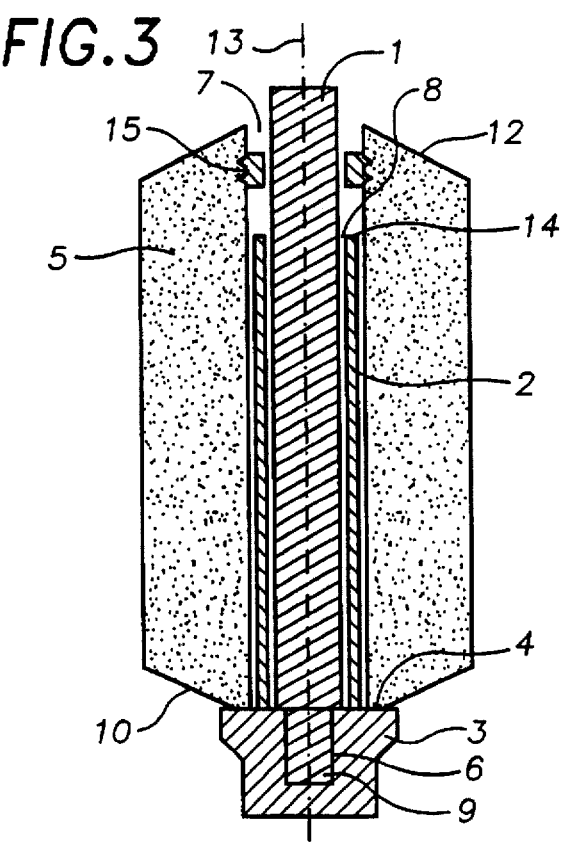

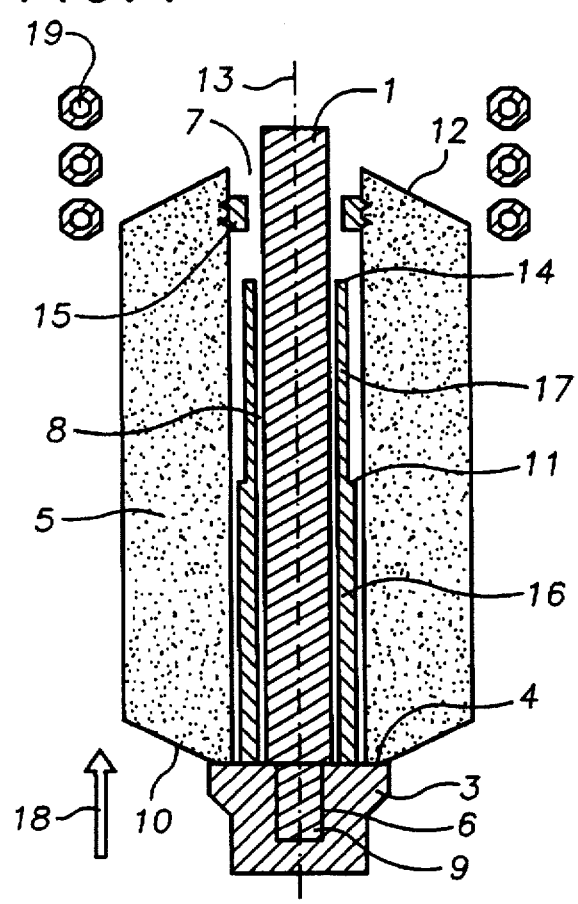
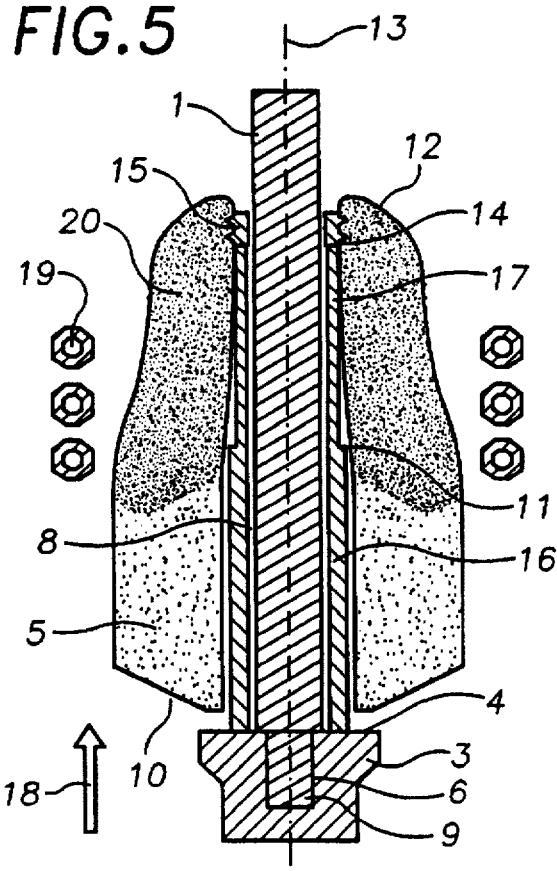

PROCESS FOR THE SINTERING OF HOLLOW CYLINDERS OF SILICON DIOXIDE SOOT

BACKGROUND OF THE INVENTION

The invention pertains to a process for the sintering of a hollow cylinder of silicon dioxide soot, where the hollow cylinder is held in a vertical orientation by a holding device and is fed continuously through a heating zone where it is sintered. The invention also pertains to a device for holding hollow cylinders of silicon dioxide soot in a vertical orientation, with an elongated support body which extends from the outside into the bore of the hollow cylinder.

The production of preforms for optical fibers and preforms for furnace components for semiconductor technology frequently proceeds by way of an intermediate product, which is in the form of a hollow cylinder of silicon dioxide soot. These so-called "soot bodies" are mechanically weak and are therefore difficult to handle, especially when they are large and heavy. In addition, extreme requirements are imposed on the purity of the soot bodies for uses in optical communications technology and semiconductor technology, which means that the difficulty of handling them during the course of the various processing steps such heat treatments or gas treatments is further complicated by the restricted range of materials which can be used for the required processing aids.

When soot bodies of this type are treated in a treatment space such as the space inside a sintering furnace, one of the problems is how to hold them safely, since these soot bodies can withstand only a small amount of mechanical stress. In the process known from U.S. Pat. No. 4,251,251, the holder consists of a bracket shaped from platinum wires, from which the hollow cylinder of soot is suspended. The walls of the hollow cylinder have two horizontal through-holes passing through the upper end, through which the platinum wires are passed. For sintering, the soot bodies are fed continuously through a vertically oriented sintering furnace. In the furnace, a certain portion of the body becomes soft. This softening zone begins at the lower end of the soot body. As the soot body is lowered progressively through the sintering furnace, the softening zone migrates continuously upward along the soot body. Thus the weight of the sintered part of the soot body hanging from the softening zone increases continuously. Because of the low viscosity of the soot in the softening zone, the weight of the soot body itself is enough to stretch the body out. The process is therefore unsuitable for the sintering of large, heavy soot bodies.

U.S. Pat. No. 4,157,906 describes another device for holding blank in the form of a hollow cylinder of silicon dioxide soot in a vertical position during the cylinder-collapsing and fiber-drawing operations. A section of quartz tubing about 50 mm long is inserted into the bore passing through the blank. The outside diameter of the quartz tube is approximately the same as the inside diameter of the blank. The end of the tube which is to be inserted into the blank is provided with bump-like projections. To anchor the piece of tubing in the bore, these bumps are rotated about 90° in the bore. The drive device used to lower the blank into the furnace grips a second piece of quartz glass tubing, which is set onto the end of the tube projecting from the bore.

U.S. Pat. No. 4,362,545 describes another device of the general type in question, in which an essentially sleeve-like handle of quartz glass is embedded in the bore of the soot body. At the end which engages with the soot body, the handle is provided with a circumferential, ring-shaped projection, which acts as a lock to prevent the handle from slipping out of the bore. The end of the sleeve projecting out of the end of the bore is designed as a cone, which is used to attach the handle to a device for suspending the soot body. The handle must be embedded while the soot body is being formed. For this purpose, the sleeve-like handle is pushed onto the deposition mandrel. The soot particles being deposited on the mandrel are also intended to cover simultaneously the end of the sleeve pushed onto the mandrel.

The known holding devices make it possible to hang hollow cylinders of silicon dioxide soot so that they can be sintered, for example, in a sintering furnace. Attaching the holders to the cylinders is a very complicated matter, however, and causes material to be rubbed off, which can lead to trouble. The known holding devices are suitable only for relatively small soot bodies. When the soot bodies are large and heavy, however, the mechanical stability of the hollow cylinder walls is no longer sufficient. There is therefore the danger that the holders will break away from the soot bodies.

SUMMARY OF THE INVENTION

The present invention is based on the task of providing a suitable process for the sintering of large, hollow cylinders of silicon dioxide and of making available a holding device for hollow cylinders of this type which are easy to attach and to remove and which ensure safe and reliable handling.

With respect to the process, during one phase of the sintering operation, the hollow cylinder stands primarily or exclusively on a support while its upper end is being sintered, whereas, during a subsequent sintering stage, it is held primarily or exclusively in a suspended manner while the lower end of the cylinder is being sintered.

At room temperature, the hollow body to be sintered (referred to below as "soot body") is essentially stable in terms of its dimensions. This means that it can be stood up or hung vertically without undergoing plastic deformation under the effect of its own weight. When the temperature is increased, the silicon dioxide soot softens in the softening zone. The viscosity of the soot decreases, with the result that the soot body is deformed by the forces acting on the softening zone. In addition to gravity, deforming forces associated with contraction are also acting on the soot body. The density of the soot body is only about 30% of that of solid quartz glass. Because sintering proceeds continuously, the softening zone migrates from one end of the soot body to the other. Especially critical with respect to the deformation of a suspended soot body is the sintering phase during which the softening zone reaches the upper end, because then the weight of the lower end of the soot body pulls on the softening zone. It is also possible, however, for the soot body to be standing on a support as it is fed through the heating zone. In this case, the opposite is true; namely, the sintering phase which is especially critical in terms of deformation is the one where the softening zone is at the lower end of the soot body, because then the upper part of the soot body exerts weight on the softening zone. The various deformations which occur are independent of the direction in which the soot body is fed through the heating zone.

In a first alternative of the process according to the invention, the soot body is sent through the heating zone while standing during one phase of the sintering operation and while suspended during another phase. This accomplishes the result that, before a soot body standing on a support enters the sintering phase during which deformation would begin or markedly increase, the way in which the soot body is supported can be changed from the standing type to the hanging type. Conversely, before a soot body hanging from a support enters the sintering phase during which deformation would begin or markedly increase, the way in which it is supported can be changed from the hanging type to the standing type. As a result, the compressive or tensile forces acting on the softening zone can be kept to a minimum. This makes it possible to sinter a soot body continuously over its entire length without any pronounced deformations. The transition from the standing to the hanging type of support or vice versa from the hanging to the standing type of support can also be implemented continuously, so that both types of support are in effect during a transition period.

In an alternative embodiment of the process according to the invention, the soot body is fed through the heating zone while standing on a support and simultaneously while hanging from a hanger. The support acts at the bottom end, the hanger at the upper end of the soot body. Because of the lengthwise contraction of the soot body during sintering, it is necessary in this variant of the process to readjust the distance between support and the hanger to compensate for the lengthwise contraction; that is, they must be moved toward each other. By means of the suitable control of this movement, the soot body is supported mostly by standing, during the sintering phase in which the upper end of the soot body is softened, whereas most of the holding function is taken over by the hanger during the sintering phase in which the lower end is softened.

The expression "sintering phase" is used to designate the portion of the overall sintering process during which the deformation of the soot body caused by its own weight remains within acceptable limits while it is being held by the holding method in question (standing or hanging). Because the deformation begins gradually and becomes more pronounced as the temperature and the sintering time increase, the beginning and end of the individual sintering phases cannot be defined precisely. The amount of deformation which is acceptable also depends on the type of deformation and on the purpose which the sintered soot body is intended to serve. For example, the buckling of the soot body associated with the use of a standing support can be more harmful for certain applications than the stretching associated with the use of a hanging support.

The process according to the invention makes it possible in particular to sinter large, heavy soot bodies which would otherwise be susceptible to deformation under the effect of their own weight.

The soot body can be sent through the heating zone either with its bottom end first or with its top end first. In the former variant, it is sintered while hanging during the first sintering phase and while standing during the second sintering phase. The latter variant of the process, however, in which the top end of the soot body is fed into the heating zone first, is preferred.

An essential advantage of this variant of the process is that the transition from the first sintering phase to the second can be realized in such a way that the hanging holder of the soot body plays its role either primarily or exclusively after the top end of the soot body has already been sintered and has left the heating zone. The hanger therefore grips a solidified area of the soot body. There is therefore little danger that the hanger will break away. The process is very reliable.

An especially effective variant of the process is one in which a hanging element grips the hollow cylinder to be sintered near its upper end; in which the hollow cylinder is supported near the lower end by a base; and in which a support element is installed underneath the hanger element in a stationary position with respect to the base. During the first sintering phase, the hanger element moves toward this support element as a result of the lengthwise contraction of the hollow cylinder, and at the beginning of the second sintering phase, the hanger element is supported by it. This variant makes it possible to achieve a very elegant transition from the standing situation to the hanging situation on the basis of the lengthwise contraction of the soot body during the sintering operation. It is known that the length of a soot body decreases during sintering. The extent of the lengthwise contraction depends, for example, on the density of the silicic acid soot and can amount to as much as 30% of the original length of the body. Through the use of the holding device described, advantage can be taken of the longitudinal shrinkage of the soot body to achieve the transition from the situation in which the soot body is standing vertically on a base to the situation in which it is suspended from the hanger. That is, the contraction of the soot body causes the hanging element attached to it to approach and then rest on the support element, after which the further lengthwise contraction of the soot body causes the lower end of the soot body to rise from the base.

A process is preferred in which the hanging element is a retaining ring, mounted inside the bore passing through the hollow cylinder, and in which a support element, which rests on the base, is inserted inside the internal bore of the hollow cylinder, this support element having an upper end facing the hanging element, on which end the retaining ring rests during the second sintering phase. Through the use of a retaining ring, the internal bore of the soot body is kept open toward the outside, which means that it is kept ventilated. The support element can be designed as a section of tubing or as a solid cylinder. The support element can also expand either conically or in stages from top to bottom. Because the retaining ring moves toward the upper end of the support element during the lengthwise contraction of the soot body and rests thereon at the beginning of the second sintering phase, the lower end of the soot body rises from the base as the lengthwise contraction continues, which means that the soot body suspends itself from the retaining ring. It is advantageous for the support element to consist of graphite and to have a smooth outer surface, so that the collapsing soot body will rest on the support element, with the result that the internal bore of the completely sintered soot body will be determined by the outside diameter of the support element.

The time of the transition from the first to the second sintering phase is determined primarily by the distance between the hanging element and the upper end of the support element. It has been found advantageous to determine the amount of lengthwise contraction to be expected during the sintering of the hollow cylinder and to adjust the distance between the retaining element and the upper end of the support element to a value in the range of 0.3–0.8 times the determined lengthwise contraction. This ensures that the soot body will not rise from the base until after its upper end has left the heating zone and has already hardened. This applies under the provision that the dimension of the heating zone, seen in the direction of the longitudinal axis of the hollow cylinder, is smaller than the length of the soot body which is able to produce, a lengthwise contraction equal to the selected distance between the retaining element and the upper end of the support element.

With respect to the device, one end of the support body is connected to a support base with a support surface. The support base serves to accept the hollow cylinder to be held in a vertical orientation. For this purpose, it is provided with a support surface, on which the bottom end of the hollow cylinder sits. The support base is connected to the essentially cylindrical support body. The support body projects into the bore of the hollow cylinder. The outside dimensions of the support body can be adjusted to the inside diameter of the hollow cylinder, so that the support body can increase the stability with which the hollow cylinder is held on the support base. For this purpose it can be sufficient for the length of the support body to be less than that of the hollow cylinder to be held. The forces required to transport or hold the hollow cylinder can in this case act on the base. It is advantageous for the support surface to be oriented horizontally.

A device in which the length of the support body is greater than the length of the hollow cylinder to be held has proven to be especially useful. The support body can project from both ends of the bore of the hollow cylinder, so that in this case the forces required for transporting or holding the hollow cylinder can also act on the part of the support body projecting out of the bore at the end opposite the support base.

It has been found to be especially favorable for the support body to be provided over at least a portion of its length with a gas-permeable jacket tube. Through the use of jacket tubes with the same inside diameter but different outside diameters, it is possible to match the part of the holding device projecting into the central bore of the hollow cylinder to different inside diameters of the hollow cylinder or of the quartz glass tube to be produced therefrom without changing the diameter of the support body. It is advantageous for the jacket tube to consist of a material which does not give off any impurities to the hollow silicon dioxide cylinder. It can, in fact, act as a barrier to impurities from the support body. Through the use of a jacket tube, the variety of materials which can be used for the support body is increased. Because the jacket tube itself is not required to play any supporting function with respect to the holding of the cylinder, it can also consist of a material of comparatively little strength. Conversely, the material for the support body can be designed for optimum performance in terms of strength. In processes in which the hollow cylinder is collapsed onto the jacket tube, the outside diameter of the jacket tube determines the inside diameter of the collapsed tube. The gas permeability of the jacket tube ensures that any gases which form during the collapse of the hollow cylinder or which are present in the pores of the silicon dioxide soot are able to escape, even if the collapsed hollow cylinder is already resting on the jacket tube. The jacket tube can consist of a single piece or of several pieces detachably connected to each other.

The jacket tube can be provided with permeability to gas by the selection of a porous material. Especially good results are obtained with a jacket tube which has an open porosity preferably in the range of 10 vol. % to 20 vol. %.

A material which is especially suitable for the jacket tube is graphite. Graphite of very high purity is commercially obtainable. Its porosity can also be adjusted as required. Because the coefficient of thermal expansion of graphite is higher than that of quartz glass, the graphite jacket tube shrinks to a greater extent when cooled than the quartz glass tube which has collapsed onto it. Thus the quartz tube can be easily separated from the jacket tube. Especially suitable in this regard is a design of the jacket tube with a conically tapering lateral surface. This makes it even easier to remove the quartz glass tube after it has vitrified.

A device in which the jacket tube has a lateral surface which tapers down in a stepwise manner from bottom to top has also proven to be effective. Between the individual steps, therefore, the jacket tube has shoulders. The individual steps between the shoulders can expand conically. When the soot body collapses onto the jacket tube, the shoulders provide retention areas, around which the softened quartz glass flows, and with which the cooled, solid quartz glass positively engages. When sintering begins at the upper end of the soot body and proceeds continuously downward, the lower part of the soot body is therefore partially relieved of the weight on top of it. To facilitate the removal of the jacket tube, it is advantage for this tube to consist of several parts connected detachably to each other.

It has been found advantageous to leave a gap with a width in the range of 0.3–1 mm, preferably of less than 0.8 mm, between the outside wall of the support body and the inside wall of the jacket tube. This gap ensures that the gases forming and escaping during the collapse of the hollow silicic acid cylinder can be discharged and thus prevents the formation of bubbles in the collapsed quartz glass tube. It is advisable to keep the gap as narrow as possible, so as not to impair the support and holding function of the support body. The gap can also be evacuated or it can be purged by an inert purge gas.

An embodiment of the holding device is preferred in which the support body consists of carbon fiber-reinforced graphite (CFC). This material combines high strength and heat resistance with a high level of chemical inertness with respect to silicon dioxide soot and quartz glass. The high strength of CFC makes it possible to minimize the cross section of the support body. Because of the generally rough surface associated with its fibrous structure, however, CFC adheres easily to glass, which means that it can be difficult to remove the support body from a glass tube collapsed onto it. A collapsed glass tube can be prevented from adhering to a CFC support body by the use of a jacket tube according to the invention. In this case, a jacket tube of graphite with a coefficient of thermal expansion suitably matched to that of the support body of CFC, has been found to be especially advantageous. In particular, in an embodiment of the holding device in which the support body takes over most of the support function, this body is advantageously designed as a solid cylinder.

It has also been found advisable to provide the support surface of the support base with a central opening, into which one end of the support body can fit. This makes it easy to center the hollow cylinder to be held on the base. Especially with the goal of simplifying the attachment and removal of the hollow cylinder, it is advantageous for the opening to be provided with an internal thread and for the end of the support body fitting into the opening to be provided with an external thread.

Exemplary embodiments of the invention are illustrated in the drawing and are explained in greater detail below.

BRIEF DESCRIPTION OF THE DRAWING

FIG. 1 is an elevation section of a holding device according to the invention with a soot body supported thereon;

FIG. 2 shows an embodiment of the holding device having a stepped jacket tube;

FIG. 3 shows an embodiment of the holding device having a retaining ring between the support rod and the soot body;

FIG. 4 shows an embodiment of the holding device with a soot body supported thereon in a sintering furnace before the start of a first sintering phase; and FIG. 5 shows the holding device according to FIG. 1 with a soot body supported thereon during a later phase of the sintering process.

DETAILED DESCRIPTION OF THE PREFERRED EMBODIMENTS

The holding device according to FIG. 1 has a bar-like support rod 1 of CFC, a jacket tube 2 of graphite, and a support base 3 of graphite. Support base 3 serves to hold the entire assembly in a treatment space such as a furnace (not shown). Support base 3 is provided with a horizontally oriented support surface 4, onto which the bottom end 10 of a hollow cylindrical soot body 5 of silicon dioxide soot is set. Support surface 4 is provided with an internally threaded hole 6 in the center, into which support rod 1 fits. For this purpose, support rod 1 has an externally threaded pin 9 at the end facing support base 3. Support rod 1 extends through internal bore 7 of soot body 5. The part of support rod 1 projecting beyond the upper end 12, of soot body 5 is used to maneuver the holding device. The weight of soot body 5 is transmitted by way of support base 3 to support rod 1.

Because of the tensile strength of CFC support rod 1, it is possible for its diameter to be relatively small. In the exemplary embodiment, its diameter is 30 mm. A gap of about 0.8 mm is provided between the inside wall of jacket tube 2 and support rod 1. Jacket tube 2 has an outside diameter of approximately 40 mm and is somewhat shorter than support rod 1. It has a porosity of approximately 15%. This jacket tube of pure graphite prevents impurities from being released by support rod 1 and entering soot body 5. Soot body 5 resting on support base 3 has an inside diameter of about 60 mm and a weight of about 100 kg. It is slightly shorter than support rod 1 and slightly longer than jacket tube 2. Soot body 5 can be transported by means of the holding device described and held in place inside a treatment space. For this purpose, it is possible for example, for a tool (not shown in the drawing) to grip the part of support rod 1 projecting out of soot body 5.

In the following, a process for collapsing soot body 5 by the use of the device according to the invention is described by way of example. For this purpose, a soot body 5 is mounted on the holding device, introduced into a furnace, and held in place there by means of support base 3. As it is heated, soot body 5 vitrifies and shrinks onto graphite jacket tube 2. Gases which form or which are already present at the boundary surface between soot body 5 and jacket tube 2 are guided through the pores of jacket tube 2 to gap, from which they can then escape. As a result, bubbles are prevented from forming in the quartz glass tube being formed. The outside diameter of the jacket tube determines the inside diameter of the quartz glass tube obtained, because soot body 5 shrinks onto the jacket tube. Because of the large difference between the coefficient of expansion of quartz glass and that of graphite, jacket tube 2 comes loose when cooled and can be easily removed.

Insofar as the reference numbers used in FIGS. 2–5 are the same as those used in FIG. 1, they designate the same or equivalent parts or components of the holding device, as already described on the basis of FIG. 1.

In the device shown in FIG. 2, a bar-like support rod 1 of carbon fiber-reinforced carbon is also provided, which is equipped with a pin 9, by means of which it is screwed into a support base 3. Base 3 has a horizontally oriented, flat support surface 4, on which the bottom end 10 of a hollow, cylindrical soot body 5 rests. Inside internal bore 7 of soot body 5 a jacket tube 2 is provided, which surrounds a portion of the length of support rod 1. Between jacket tube 2 and support rod 1 there is a gap 8 of about 0.5 mm. The outside diameter of jacket tube 2 increases in a stepwise manner from top to bottom in steps of approximately 1 mm. The shoulders formed by the graduations are referred to in FIG. 2 by reference numbers 11a, 11b. In the exemplary embodiment according to FIG. 2, there are two of these shoulders 11a, 11b.

Soot body 5, starting with its upper end 12, is sent continuously through a sintering furnace (not shown in FIG. 2). Soot body 5, which collapses in the sintering furnace, comes to rest against the outside wall of jacket tube 2, starting from upper end 12. As this is happening, it also flows around shoulders 11a, 11b. After cooling, that is, after it has left the heating zone, the partially vitrified and hardened soot body 5 engages positively with shoulders 11a, 11b. It therefore supports itself first on shoulder 11a and later on shoulder 11b and thus relieves the lower, not yet melted part of soot body 5 of the weight resting on it from above. Jacket tube 2, provided with shoulders 11a, 11b, thus acts as an anti-slip device for collapsing soot body 5. Depending on the distance between, and number of, shoulders 11a, 11b, it is also possible for the lengthwise contraction which occurs during the collapsing operation to raise soot body 5 from support surface 4 the soot body thus being suspended from shoulders 11a, 11b. To ensure that the collapsed part of the soot body cools as quickly as possible and engages positively with shoulders 11a, 11b, the length of the heating zone inside the sintering furnace should be relatively short as seen in the direction of longitudinal axis 13 of soot body 5, preferably shorter than the distance between upper edge 14 of jacket tube 2 and first shoulder 11a.

In the embodiment according to FIG. 2, jacket tube 2 is made of a single piece of material. In an alternative embodiment, it consists of three parts, which can be inserted into or stacked onto one another.

In the embodiment shown in FIG. 3, the device differs from that according to FIG. 1 essentially by the additional presence of a retaining ring 15, which is screwed into the inside bore of soot body 5 at upper end 12. The inside diameter of retaining ring 15 is approximately the same as the inside diameter of jacket tube 2. The way in which retaining ring 15 functions during the collapse of soot body 5 is explained in greater detail below on the basis of the embodiments of the holding device illustrated in FIGS. 4 and 5.

FIG. 4 shows a soot body held by a holding device according to the invention in a process step immediately before the first sintering phase, and FIG. 5 shows, the same soot body 5, already partially sintered, in a later phase of the sintering operation.

The jacket tube in this case is a two-part graphite tube, the lower part 16 of which has an outside diameter of 50 mm. An upper part 17 with an outside diameter of 48 mm is removably seated on top. The transition from lower part 16 to upper part 17 therefore takes the form of a 1-mm-deep shoulder 11. A retaining ring 15 of graphite is screwed into the inside wall of soot body 5 about 20 cm from upper edge of upper jacket tube part 17.

Soot body 5 held on the holding device is introduced in the direction of arrow 18 into a sintering furnace, the heating zone of which is illustrated schematically by heat conductor 19. The length of heating zone 19 in the direction of longitudinal axis 13 is only a fraction of the total length of soot body 5. In the processing stage illustrated in FIG. 4, soot body 5 is resting on support surface 4 of base 3. Soot body 5 is heated in heating zone 19, starting from its upper end 12. Softening soot body 5 comes to rest against the outer lateral surface of jacket tube parts 16, 17. In FIG. 5, the part of the soot body which has already turned to glass is designated 20.

As a result of the sintering treatment, soot body 5 shrinks in both diameter and length. The contraction of the diameter has the effect that retaining ring 15 is tightly enclosed by vitrifying soot body 5. Because of the lengthwise contraction, retaining ring 15 moves in a relative sense toward upper edge 14 of upper jacket tube part 17. As soon as retaining ring 15 rests on upper edge 14 of upper jacket tube part 17, the further lengthwise contraction of soot body 5 has the effect of lifting lower end 10 from support surface 4. In this phase of the sintering operation, which is illustrated in FIG. 5, soot body 5, i.e., the vitrified part of soot body 20, is suspended exclusively by retaining ring 15. In this phase of the sintering process, upper end 15 has already left heating zone 19 and has therefore cooled to such a extent that no more deformation need be feared.

As soot body 5 continues to collapse, the glassy material softening in heating zone 19 also flows around jacket tube shoulder 11. On cooling, the already vitrified part 20 of soot body 5 positively engages with jacket tube shoulder 11 and thus supports itself there. The positive engagement with jacket tube shoulder 11 improves the support of soot body 5 and shifts it further downward. Jacket tube shoulder 11 therefore acts as an anti-slip device for collapsing soot body 5.

The process according to the invention ensures that, during the sintering phase in which upper end 12 of the soot body softens, soot body 5 rests on and is supported by base 3; and that, during the sintering phase in which lower end 10 of soot body 5 softens, soot body 5 hangs from and is supported by retaining ring 15 and/or jacket tube shoulder 11; and also that the change from the standing type of support to the hanging type of support of soot body 5 occurs automatically as a result of the lengthwise contraction of the soot body.

The applicability of the device according to the invention is not limited to the holding of hollow cylinders of silicon dioxide soot. It is also suitable for the holding of hollow cylinders of other chemical compositions and, as discussed above, also for the calibration of the inside diameter of glass tubes, for example.

What is claimed is:
1. Process for sintering a hollow cylinder of silicon dioxide soot, said process comprising,
providing a hollow cylinder of silicon dioxide soot having an upper end and a lower end,
supporting the lower end so that said cylinder is vertically oriented,
sintering said upper end while said lower end is supported during a first sintering phase,
holding said sintered upper end so that said cylinder is suspended vertically, and
sintering said lower end while said upper end is held during a second sintering phase.
2. Process as in claim 1 wherein said hollow cylinder is sintered by moving it continuously upward relative to a heating zone, said upper end being introduced into said heating zone first.
3. Process as in claim 1 wherein, prior to sintering, said lower end is supported by a having a vertically extending support element fixed thereto, said upper end having engaged thereto a hanging element which is arranged so that, during said first sintering phase, said hanging element moves against said support element as a result of lengthwise contraction of said hollow cylinder.
4. Process according to claim 3 wherein said hanging element is a retaining ring fixed inside said hollow cylinder, said support element also being inside said hollow cylinder and extending upward toward said retaining ring, said retaining ring resting on said support element during said second sintering phase.
5. Process as in claim 3 further comprising, prior to sintering,
determining the lengthwise contraction which will occur during the first sintering phase, and
engaging said hanging element to said hollow cylinder so that, when said hollow cylinder is supported on said base, said hanging element is spaced from said support element by a distance which is 0.3 to 0.8 times the determined lengthwise contraction.
6. Process as in claim 1 further comprising providing vertical support means located inside said hollow cylinder, said vertical support means being profiled to receive and support said upper end of said hollow cylinder when said upper end undergoes radial shrinkage, whereby said lower end is raised due to longitudinal shrinkage and said cylinder is suspended vertically.

* * * * *

UNITED STATES PATENT AND TRADEMARK OFFICE
CERTIFICATE OF CORRECTION

PATENT NO. : 5,665,132

DATED : September 9, 1997

INVENTOR(S) : Ruppert et al.

It is certified that error appears in the above-identified patent and that said Letters Patent is hereby corrected as shown below:

In column 4, line 64, after "produce" delete -- , --.

In column 7, line 48, after "gap" add -- 8 --.

In column 8, line 25, after "surface 4" add -- , --.

Signed and Sealed this

Thirteenth Day of July, 1999

Attest:

Attesting Officer

Q. TODD DICKINSON

Acting Commissioner of Patents and Trademarks